(12) United States Patent
Keil et al.

(10) Patent No.: US 11,202,541 B2
(45) Date of Patent: Dec. 21, 2021

(54) OUTER ROTOR MOTOR AND CLEANER COMPRISING SAME

(71) Applicant: Johnson Electric S.A., Murten (CH)

(72) Inventors: Ronny Keil, Shenzhen (CN); Bhoopal Ponnuvelu, Hong Kong (CN); Kwong Yip Poon, Hong Kong (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 676 days.

(21) Appl. No.: 15/806,028

(22) Filed: Nov. 7, 2017

(65) Prior Publication Data

US 2018/0132684 A1 May 17, 2018

(30) Foreign Application Priority Data

Nov. 17, 2016 (CN) .......................... 201611020681.3

(51) Int. Cl.
*A47L 9/04* (2006.01)
*H02K 1/18* (2006.01)
(Continued)

(52) U.S. Cl.
CPC ........... *A47L 9/0411* (2013.01); *A47L 9/0455* (2013.01); *A47L 9/0477* (2013.01); *H02K 1/187* (2013.01);
(Continued)

(58) Field of Classification Search
CPC .... A47L 9/0411; A47L 9/0477; A47L 9/0455; A47L 9/04; H02K 21/22; H02K 5/1735;
(Continued)

(56) References Cited

U.S. PATENT DOCUMENTS

| | | | | |
|---|---|---|---|---|
| 4,426,751 A | * | 1/1984 | Nordeen | A47L 9/0411 15/384 |
| 6,762,521 B2 | * | 7/2004 | Peter | H02K 1/187 310/43 |

(Continued)

FOREIGN PATENT DOCUMENTS

| CN | 102025212 A | 4/2011 |
|---|---|---|
| CN | 104958046 A | 10/2015 |

(Continued)

OTHER PUBLICATIONS

Chapter 4 "Non-Metallic Materials and Composite Materials," Section 4.1 Plastic Materials, Engineering Materials and Molding Technology 2nd Edition, Edited by Liming Li and Hongmei He, Beijing University of Posts and Telecommunications Press, Apr. 30, 2012 (with English translation of summary attached)(6 pages).

(Continued)

*Primary Examiner* — David Redding
(74) *Attorney, Agent, or Firm* — Muncy, Geissler, Olds and Lowe, P.C.

(57) ABSTRACT

An outer rotor motor includes an inner stator and an outer rotor. The inner stator includes a stator frame and a stator unit mounted to the stator frame. The outer rotor includes a shaft and a rotor unit fixed to the shaft. The stator frame is integrally formed from plastic as an integral structure and comprises a base and a hub extending from the base, the hub forms a chamber therein, supporting components are installed in the chamber, and the shaft extends into the chamber and supported by the supporting components such that the shaft is rotatable relative to the stator frame. In the present invention, the stator frame has an integral structure made of plastic which simplifies the structure of the motor and reduces the cost of the motor. The present invention further provides a vacuum cleaner that employs the motor.

19 Claims, 5 Drawing Sheets

(51) Int. Cl.
   H02K 1/27      (2006.01)
   H02K 5/16      (2006.01)
   H02K 15/14     (2006.01)
   H02K 7/08      (2006.01)
   H02K 21/22     (2006.01)
   H02K 7/14      (2006.01)
   H02K 5/173     (2006.01)

(52) U.S. Cl.
   CPC .......... H02K 1/2786 (2013.01); H02K 5/16 (2013.01); H02K 5/1735 (2013.01); H02K 7/083 (2013.01); H02K 7/14 (2013.01); H02K 15/14 (2013.01); H02K 21/22 (2013.01)

(58) Field of Classification Search
   CPC ........ H02K 1/187; H02K 1/2786; H02K 5/16; H02K 7/14; H02K 15/14; H02K 7/083; H02K 7/08
   See application file for complete search history.

(56) References Cited

U.S. PATENT DOCUMENTS

| | | |
|---|---|---|
| 10,673,289 B2 | 6/2020 | Nakagawa et al. |
| 2013/0106252 A1 | 5/2013 | Yanagida |
| 2016/0365769 A1* | 12/2016 | Raczek ................ H02K 5/1732 |
| 2018/0102685 A1* | 4/2018 | He ........................ H02K 5/161 |

FOREIGN PATENT DOCUMENTS

| | | |
|---|---|---|
| CN | 105846564 A | 8/2016 |
| DE | 10353880 A1 * | 6/2004 |
| JP | 1993070161 U | 9/1993 |
| JP | H-09200995 A | 7/1997 |
| JP | 2002010564 A | 1/2002 |
| JP | 2007037395 A | 2/2007 |
| JP | 2007267503 A | 10/2007 |
| JP | 2011211829 A | 10/2011 |
| JP | 2012125129 A | 6/2012 |
| JP | 2013093983 A | 5/2013 |
| JP | 2013158204 A | 8/2013 |
| JP | 2015084646 A | 4/2015 |
| JP | 2015144546 A | 8/2015 |

OTHER PUBLICATIONS

Office Action dated Sep. 14, 2021 in JP Application No. 2017-221508, 6 pages.

* cited by examiner

C-C

OUTER ROTOR MOTOR AND CLEANER COMPRISING SAME

CROSS REFERENCE TO RELATED APPLICATIONS

This non-provisional patent application claims priority under 35 U.S.C. § 119(a) from Patent Application No. 201611020681.3 filed in The People's Republic of China on Nov. 17, 2016, the entire contents of which are incorporated herein by reference.

FIELD OF THE INVENTION

The present invention relates to electric machines, and in particular to an outer rotor motor and a vacuum cleaner using the outer rotor motor

BACKGROUND OF THE INVENTION

A stator of a traditional outer rotor motor usually comprises a base made of aluminum and a hub made of aluminum. The base and the hub are integrally formed as a single unit. The base is usually round disc-shaped for mounting the electric motor to a workstation. The hub extends from the base for extension of a rotor shaft to support the rotor. Two ball bearings are respectively installed at opposite ends of the hub for supporting the rotor shaft. The number of components of this kind of motoris high, the cost of forming the integral base and hub is high and the manufacturing efficiency is low.

SUMMARY OF THE INVENTION

Thus, there is a desire to provide an outer rotor motor with a simple structure.

In one aspect, the present invention provides an outer rotor motor which comprises an inner stator and an outer rotor. The inner stator comprises a stator frame and a stator unit mounted to the stator frame. The outer rotor comprises a shaft and a rotor unit fixed to the shaft. The stator frame is integrally formed from plastic as a single structure and comprises a base and a hub extending from the base. The hub forms a chamber therein, supporting components are installed in the chamber, and the shaft extends into the chamber and supported by the supporting components such that the shaft is rotatable relative to the stator frame.

Preferably, the supporting components are two bearings respectively mounted at opposite ends of the chamber.

Preferably, the number of the supporting components is two, the two supporting components are spaced from each other, and a portion of the chamber between the two supporting components forms a receiving space for receiving lubricant therein.

Preferably, the chamber has an inner diameter at the locations where the supporting components are installed, the receiving space has an inner diameter, and the inner diameter of the chamber is greater than the inner diameter of the receiving space.

Preferably, the hub has an axially extended locating slot formed at an outer surface thereof and the stator unit is mounted around the hub and positioned by the locating slot.

Preferably, the outer surface of the hub forms a step at a location near to the base, and the stator unit is mounted around the hub and limited by the step.

Preferably, the base forms mounting holes and nuts are respectively fixed in the mounting holes.

Preferably, opposite two ends of the shaft extend beyond the hub, and a first limiting member and a second limiting member are respectively mounted on the shaft and located at opposite sides of the hub for limiting axial play of the shaft relative to the hub.

Preferably, an end of the shaft near the base forms a groove extending in a circumferential direction of the shaft for receiving the first limiting member which is an elastic C-shaped ring.

Preferably, the outer rotor comprises a connecting member fixed to the shaft, and a cylindrical casing surrounding the shaft and the hub, the cylindrical casing having an end fixed to the shaft via the connecting member.

Preferably, the connecting member comprises an annular ring fixed around the shaft, and a connecting portion extending outwardly from the ring, the connecting portion fixed with the cylindrical casing.

Preferably, a second limiting member is mounted on the shaft and located between the hub and the connecting member for limiting axial play of the shaft relative to the hub.

Preferably, a gasket is arranged between the second limiting member and the hub.

Preferably, the stator unit comprises a stator core and a winding wound on the stator core, and the rotor unit comprises a cylindrical casing fixed around the shaft and one or more permanent magnets mounted to an inner surface of the casing.

Preferably, the outer rotor has an outer diameter larger than that of the base.

In another aspect, the present invention provides a vacuum cleaner employing the electric motor described above. The vacuum cleaner comprises a body, a roller brush rotatably mounted to the body, and an outer rotor motor described above. The outer rotor motor is mounted in the roller brush, the inner stator of the outer rotor motor is fixed with the body, and the outer rotor of the outer rotor motor is configured to drive the roller brush to rotate.

In the present invention, the stator frame of the motor has an integrally formed plastic structure which simplifies the structure of the motor and reduces the cost of the motor.

BRIEF DESCRIPTION OF THE DRAWINGS

The present invention will be further described below with reference to the accompanying drawings and the following embodiments. It should be noted that the figures are illustrative rather than limiting the scope of the invention.

DETAILED DESCRIPTION OF THE PREFERRED EMBODIMENTS

Figure 1:
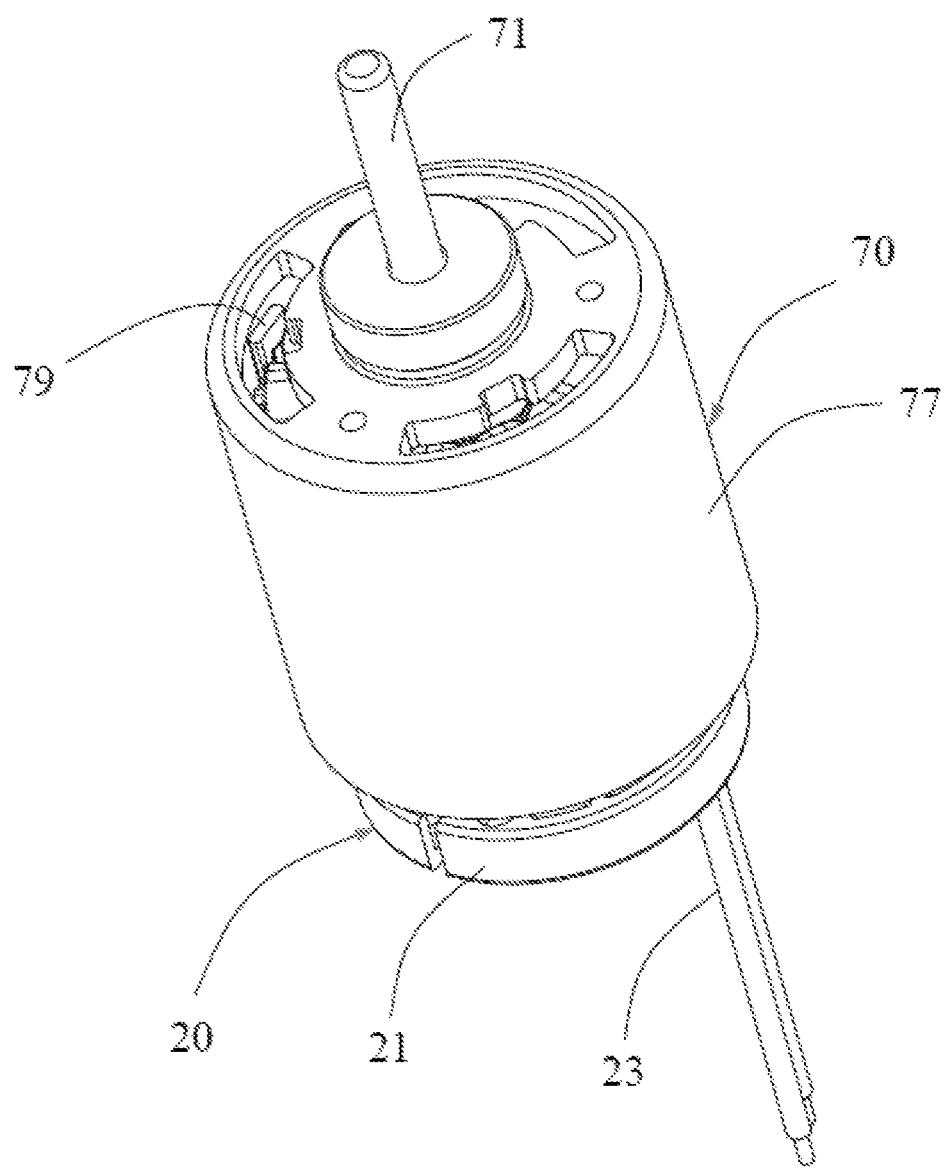
FIG. 1 is a perspective view of an outer rotor motor according to one embodiment of the present invention.

Below, embodiments of the present invention will be described in greater detail with reference to the drawings.

Elements of similar structures or functions are generally represented by like reference numerals for illustrative purposes throughout the figures. It should be noted that the figures are illustrative rather than limiting. The figures are not drawn to scale, do not illustrate every aspect of the described embodiments, and do not limit the scope of the present disclosure. Unless otherwise specified, all technical and scientific terms used in this disclosure have the ordinary meaning as commonly understood by people skilled in the art.

Figure 2:
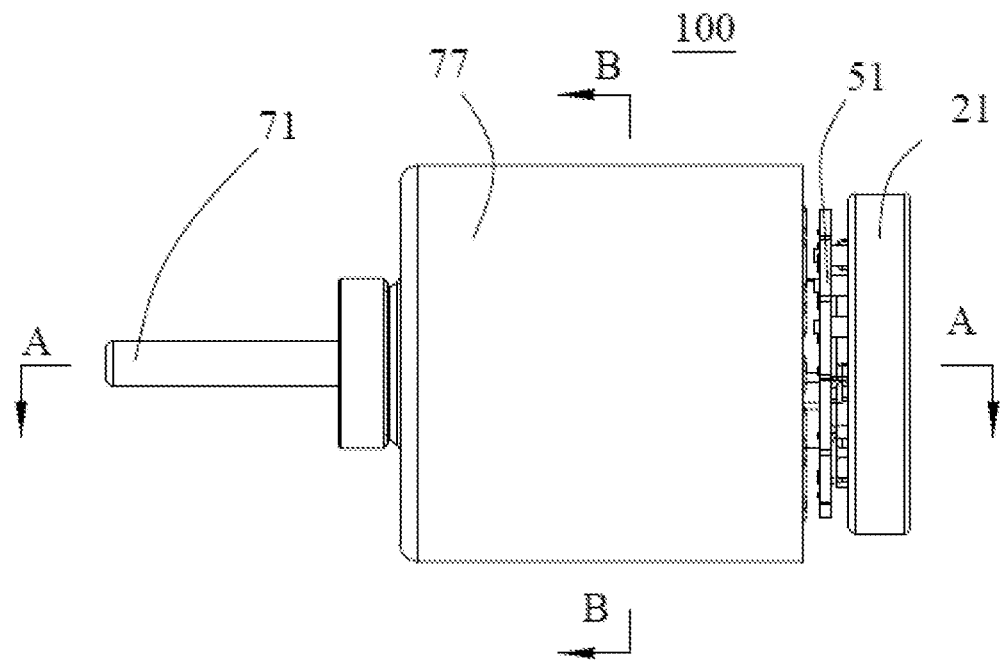
FIG. 2 is a side view of the motor of FIG. 1.

Referring to FIG. 1 and FIG. 2, an outer rotor motor 100 in accordance with one embodiment of the present invention includes an inner stator 20 and an outer rotor 70.

The inner stator 20 comprises a base 21, a hub 31 (see FIG. 3) extending from the base 21, and a stator unit mounted to the hub 31. The stator unit comprises for example a stator core 41 (see FIG. 4) and a circuit board 51 and so on. The stator core 41 is made of magnetic conductive material such as iron laminations stacked together. The circuit board 51 is mounted on the hub 31 and located between the base 21 and the stator core 41. The circuit board 51 has motor drive circuits arranged thereon. The motor drive circuits are connected to an outside power source via a power line 23 which is not the key invented feature of the present invention and therefore not shown in FIG. 2.

The outer rotor 70 comprises a pivot shaft 71 and a rotor unit mounted to the shaft 71. In at least one embodiment, the rotor unit comprises a cylindrical casing 77 preferably and one or more permanent magnets mounted to the inner surface of the casing 77. The one or more permanent magnets forms a plurality of permanent magnetic poles. The hub 31 defines a through chamber for extension of the shaft 71 which is pivotably supported by the hub 31 to thereby allow the outer rotor 70 to be rotatable relative to the inner stator 20.

Figure 3:
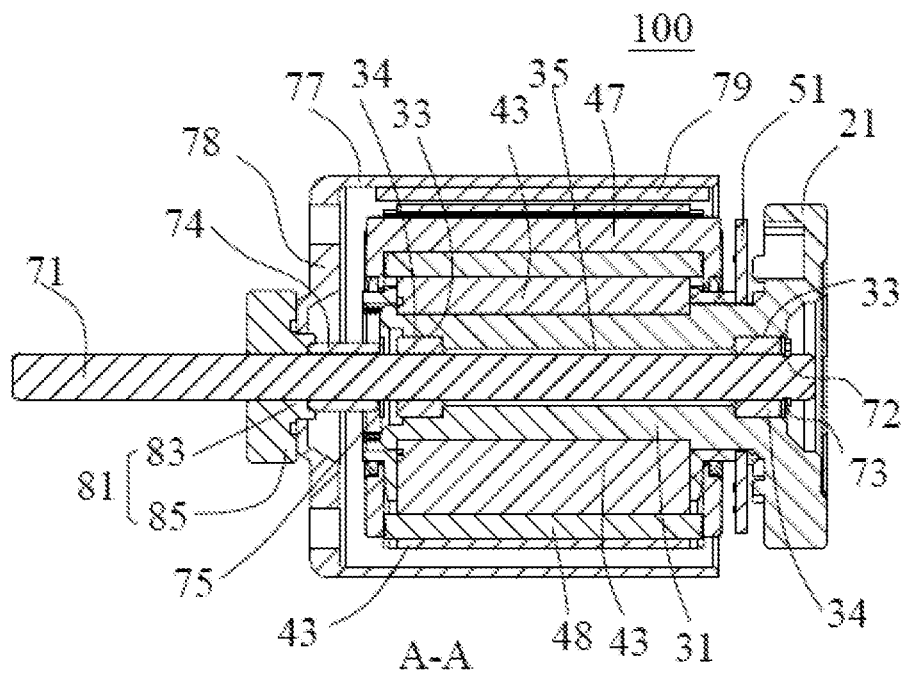
FIG. 3 is a cross section view of the motor of FIG. 2, taken along line A-A.

Referring to FIG. 2 and FIG. 3, the base 21 and the hub 31 are integrally formed from plastic material as a single integral structure in at least one embodiment. Exemplary plastic materials might include acrylonitrile-butadiene-styrene, polyamides, polycarbonate, polypropylene, and/or polystyrene. The single integral structure is used as a stator frame for mounting the stator unit thereon. The base 21 and the hub 31 may be preferably made of Glass Fiber Reinforced Polyphthalamide (GFR-PPA).

A through chamber is defined in the hub 31 for passing through of the shaft 71. Two bearing recesses 33 are respectively formed at opposite ends of the through chamber of the hub 31. Each bearing recess 33 has a bearing 34 mounted therein. The shaft 71 of the rotor 70 passes through the through chamber of the hub 31 and is rotatably supported by the bearings 34 which results in the rotor 70 being rotatable about the hub 31 of the stator 20. The bearing 34 in at least one embodiment is a bushing, which has a simple structure and is easy to assembly. Understandably, the bearing 34 also may be a ball bearing.

The portion of the chamber of the hub 31 located between the two bearings 34 forms a receiving space 35 for storing lubricants therein. The lubricants, preferably lubricating oil, stored in the receiving space 35 can flow to the interface between the shaft 71 and the bearings 34 so that the shaft 71 can rotate easily and smoothly in the bearings 34. Preferably, the diameter of the bearing recess 33 is larger than that of the receiving space 35 and the inner diameter of the bearing 34 is less than the diameter of the receiving space 35.

The cylindrical casing 77 of the outer rotor surrounds the shaft 71 and the hub 31. One end of the casing 77 is fixed to the shaft 71 directly or indirectly and therefore the casing 77 is rotatable with the shaft 71. In this embodiment, a connecting member 81 is fixedly mounted on the shaft 71. The connecting member 81 comprises an annular ring 83 fixed around the shaft 71 and a connecting portion 85 extending outwardly from the ring 83. The end of the casing 77 is fixed with the connecting portion 85 to thereby be fixed to the shaft 71. In this embodiment, the end of the casing 77 has a bottomed portion 78 fixed to the connecting portion 85 of the connecting member 81.

Opposite ends of the shaft 71 extend beyond the opposite ends of the hub 31. First and second limiting members 73, 74 are respectively mounted on the shaft 71 at opposite sides of the hub 31 for limiting axial play of the shaft 71 relative to the hub 31. Specifically, the end of the shaft 71 near the base 21 defines a groove 72 extending along the circumferential direction of the shaft 71. The groove 72 is configured for mounting the first limiting member 73 therein to prevent the shaft 71 moving away from the hub 31 in a direction away from the base 21. Preferably, the groove 72 is an annular groove and the first limiting member 73 is an elastic C-shaped ring. The second limiting member 74 is an annular-shaped ring. The second limiting member 74 is arranged between the hub 31 and the connecting member 81. Preferably, a gasket 75 is arranged between the second limiting member 74 and the hub 31.

In other embodiments, the first and second limiting members 73, 74 can be disposed other structures. In an alternative embodiment, the annular ring 83 of the connecting member 81 and the second limiting member 74 may be formed as an integral structure. Thus, the connecting member 81 has functions of fixing the casing 77 to the shaft 71 and limiting axial play of the shaft 71 relative to the hub 31.

Figure 4:
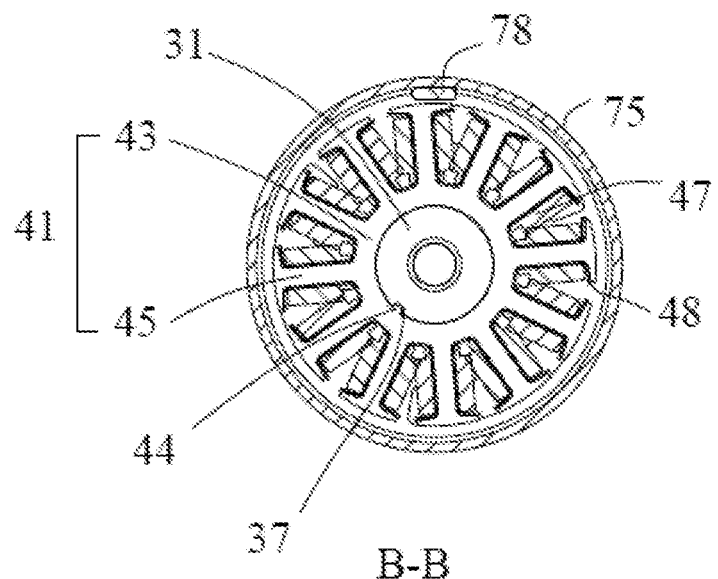
FIG. 4 is a cross section view of the motor of FIG. 2, taken along line B-B.

Referring to FIG. 3 and FIG. 4, the stator core 41 comprises an annular yoke 43 and a plurality of teeth 45 extending outwardly from the yoke 43. The stator winding 47 is wound on the teeth 45 of the stator core 41. The winding 47 is insulated from the stator core 41 by an insulating member 48 such as an insulating lining. In operation of the motor, the stator winding 47 is electrified by the drive circuits on the circuit board 51 to generate a rotatable magnetic field to urge the outer rotor 70 to rotate relative to the stator 20.

Figure 5:
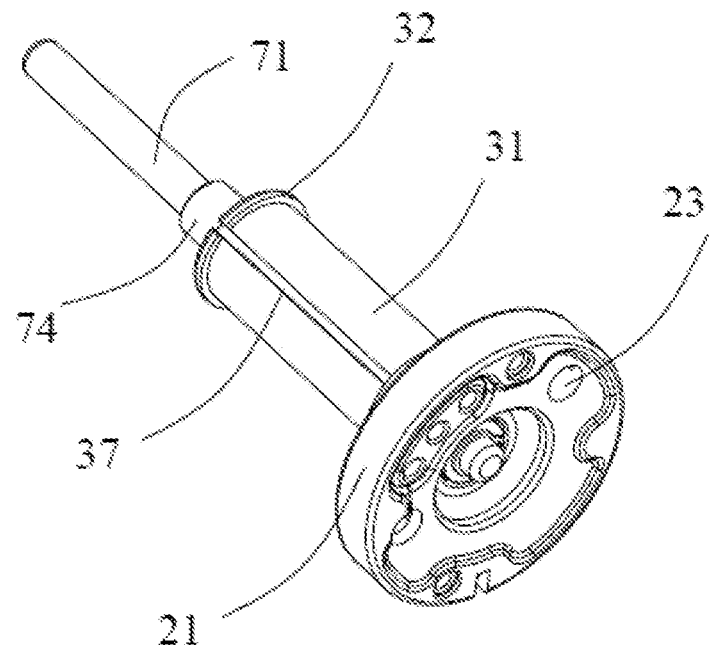
FIG. 5 is a perspective view of a stator frame and a rotor shaft of the motor of FIG. 1.

Referring to FIG. 4 and FIG. 5, the yoke 43 is mounted around the outer surface of the hub 31. Preferably, the outer surface of the hub 31 defines a locating slot 37 extending in a direction parallel to the axis of the shaft 71. The yoke 43 of the stator core 41 forms a locating projection 44 in the inner surface thereof. When the yoke 43 of the stator core 41 is mounted around the hub 31 the locating projection 44 is received in the locating slot 37 to thereby position and fix the stator core 41 to the hub 31.

Preferably, the hub 31 and the stator core 41 may be fixed together via ultrasonic welding. For example, after mounting the stator core 41 on the hub 31, the end of the hub 31 away from the base 21 protrudes a flange 32 via ultrasonic welding. The flange 32 is configured for stopping the stator core 41 off from the hub 31. Understandably, the hub 31 and the stator core 41 may be fixed together by the locating projection 37 engaged in the locating slot 37 and ultrasonic welding.

Figure 6:
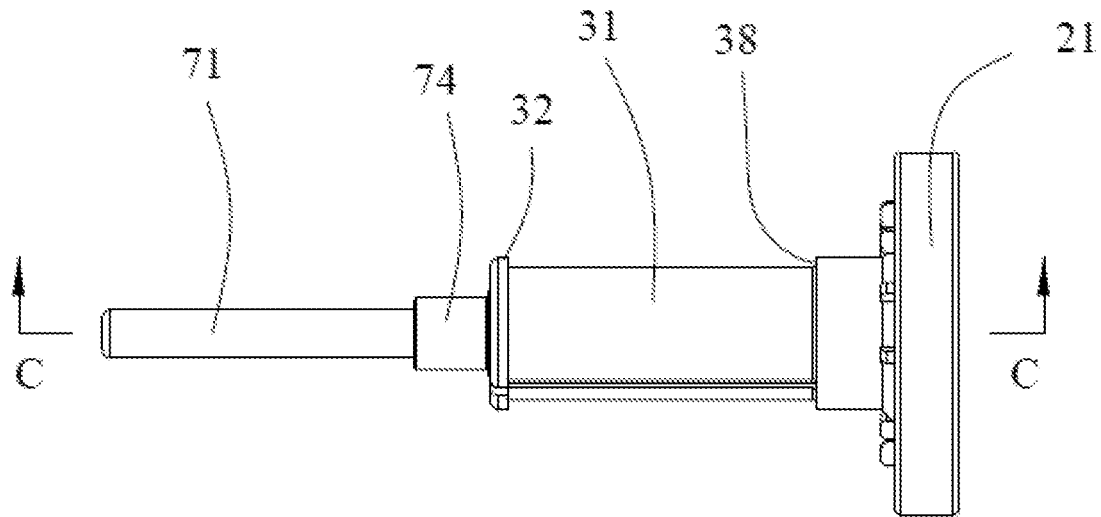
FIG. 6 is a side view of the stator frame and the rotor shaft of FIG. 5.
Figure 7:
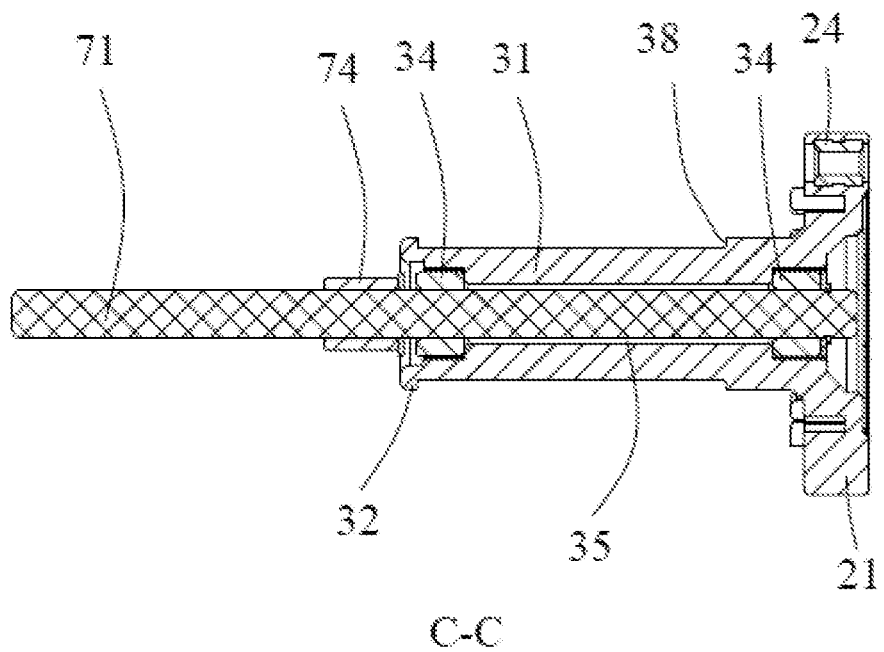
FIG. 7 is a cross section view of the stator frame and the rotor shaft of FIG. 6, taken along line C-C.

Referring to FIGS. 5-7, the hub 31 comprises a step 38 at the end near the base 21. The step 38 is configured to limit the position of the yoke 43 of the stator core 41 when the yoke 43 is mounted on the hub 31. Thus, the stator core 41 is located between the step 38 and the flange 32, specifically, the stator core 41 is axially limited on the hub 31 by the flange 32 and the step 38 and circumferentially limited on the hub 31 by the locating projection 37 engaged in the locating slot 37.

In at least one embodiment, the base 21 may define mounting holes 23 for mounting the motor on a work station. Preferably, nuts 24 may be fixed in the mounting holes 23. In other embodiments, the nuts 24 and/or the bearings 34 may be fixed to the base 21 and/or the hub 31 via insert-moulding or over-moulding technology.

The present invention simplifies the structure of the motor, facilitates the assembly of the motor and reduces the cost of the motor. The electric motor of the present invention is particularly suitable for home appliances such as vacuum cleaners.

Figure 8:
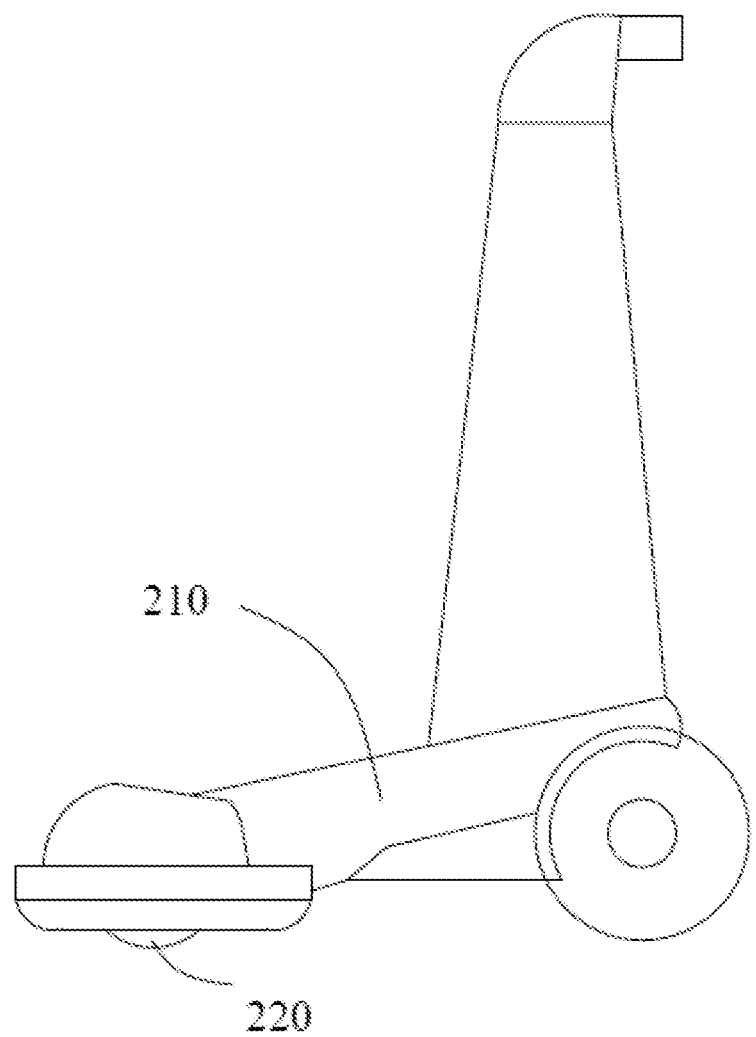
FIG. 8 illustrates a vacuum cleaner in accordance with another embodiment of the present invention.

Referring to FIG. 8, the electric motor of the present invention may be employed to a vacuum cleaner 200. The cleaner 200 comprises a body 210 and a roller brush 220 rotatably mounted to the body 210. As shown in FIGS. 1-3, in at least one embodiment, the outer diameter of the outer rotor 70 may be larger than that of the base 21. Thus, the electric motor may be mounted within the roller brush 220 without affecting the rotation of the roller brush 220. In other embodiments, the motor also can be disposed at one end or opposite ends of the roller brush 220. The outer rotor 70 is disposed in the roller brush 220 and the base 21 can be exposed to the roller brush 220 therefore. The outer diameter of the base 21 can be set as needed without limited by roller brush 220.

The cleaner 200 in accordance with the present invention where the motor is mounted within the roller brush 220, the base 21 of the inner stator 20 is fixed with the body 210, and the outer rotor of the motor is used to drive the roller brush 220 to rotate, has a more compact structure and reduced size due to use the inside space of the roller brush 220, compared to traditional designs where the motor is located radially or axially outside of the roller brush 220. In addition, the stator frame including the base 21 and the hub 31 is made of plastic. Thus, the stator frame has a light weight and low cost, which reduces the weight and cost of the cleaner.

Therefore, the technical solutions of embodiments of the present invention have been clearly and completely described above. Apparently, the described embodiments are merely part of, rather than all of, the embodiments of the present invention. A person skilled in the art may make various combinations of technical features in the various embodiments to meet practical needs. Based on the described embodiments of the present invention, any other embodiment obtained by a person skilled in the art without paying creative efforts shall also fall within the scope of the present invention.

The invention claimed is:

1. An outer rotor motor comprising:
   an inner stator comprising a stator frame and a stator unit mounted to the stator frame; and
   an outer rotor comprising a shaft and a rotor unit fixed to the shaft;
   wherein the stator frame is integrally formed from plastic as a single structure and comprises a base and a hub extending from the base, the hub forms a chamber therein, supporting components are installed in the chamber, and the shaft extends into the chamber and is supported by the supporting components such that the shaft is rotatable relative to the stator frame,
   wherein the hub and the stator core are fixed together via ultrasonic welding and an end of the hub away from the base is formed with a flange via ultrasonic welding for positioning the stator core.

2. The outer rotor motor of claim 1, wherein the supporting components comprises two bearings respectively arranged at opposite ends of the chamber.

3. The outer rotor motor of claim 2, wherein the bearing arranged at opposite ends of the chamber is bushing.

4. The outer rotor motor of claim 1, wherein the number of the supporting components is two, the two supporting components are spaced from each other, and a portion of the chamber located between the supporting components forms a receiving space for receiving lubricant therein.

5. The outer rotor motor of claim 4, wherein the chamber has an inner diameter at the locations where the supporting components are installed, the receiving space has an inner diameter, and the inner diameter of the chamber is greater than the inner diameter of the receiving space.

6. The outer rotor motor of claim 1, wherein the outer surface of the hub forms a step at a location near to the base, and the stator unit is arranged around the hub and limited by the step.

7. The outer rotor motor of claim 1, wherein the base forms mounting holes and nuts are respectively fixed in the mounting holes.

8. The outer rotor motor of claim 1, further comprising nuts fixed to the base via insert-moulding or over-moulding technology.

9. The outer rotor motor of claim 1, wherein opposite two ends of the shaft extend beyond the hub, and a first limiting member and a second limiting member are respectively mounted on the shaft and located at opposite sides of the hub for limiting axial play of the shaft relative to the hub.

10. The outer rotor motor of claim 9, wherein an end of the shaft near the base forms a circumferential groove for receiving the first limiting member which is an elastic C-shaped ring.

11. The outer rotor motor of claim 1, wherein the outer rotor comprises a connecting member fixed to the shaft, and a cylindrical casing surrounding the shaft and the hub, the cylindrical casing having an end fixed to the shaft via the connecting member.

12. The outer rotor motor of claim 11, wherein the connecting member comprises an annular ring fixed around the shaft, and a connecting portion extending outwardly from the ring, the connecting portion fixed with the cylindrical casing.

13. The outer rotor motor of claim 11, wherein a second limiting member is mounted on the shaft and located between the hub and the connecting member for limiting axial play of the shaft relative to the hub, a gasket is arranged between the second limiting member and the hub.

14. The outer rotor motor of claim 1, wherein the stator unit comprises a stator core and a winding wound on the stator core, and the rotor unit comprises a cylindrical casing fixed around the shaft and one or more permanent magnets mounted to an inner surface of the casing.

15. The outer rotor motor of claim 1, wherein the outer rotor has an outer diameter larger than that of the base.

16. A vacuum cleaner, comprising a body and a roller brush rotatably mounted to the body, wherein the cleaner further comprises an outer rotor motor of claim 1, the outer rotor motor being mounted in the roller brush, the inner stator of the outer rotor motor being fixed with the body, and the outer rotor of the outer rotor motor being configured to drive the roller brush to rotate.

17. The vacuum cleaner of claim 16, wherein the outer rotor has an outer diameter larger than that of the base of the outer rotor motor.

18. The outer rotor motor of claim 1, wherein the hub has an axially extended locating slot formed at an outer surface thereof and the stator unit is arranged around the hub and positioned by the locating slot.

19. An outer rotor motor comprising:
- an inner stator comprising a stator frame and a stator unit mounted to the stator frame; and
- an outer rotor comprising a shaft and a rotor unit fixed to the shaft;
- wherein the stator frame is integrally formed from plastic as a single structure and comprises a base and a hub extending from the base, the hub forms a chamber therein, supporting components are installed in the chamber, and the shaft extends into the chamber and is supported by the supporting components such that the shaft is rotatable relative to the stator frame,
- wherein an end of the hub away from the base is formed with a flange for positioning the stator core.

\* \* \* \* \*